United States Patent [19]

Beeson et al.

[11] 4,261,020
[45] Apr. 7, 1981

[54] CONTINUOUS SPEED CONTROL SYSTEM FOR VIDEO TAPE RECORDER

[75] Inventors: Gary H. Beeson; George W. Bates, both of Santa Ana, Calif.

[73] Assignee: Convergence Corporation, Irvine, Calif.

[21] Appl. No.: 63,937

[22] Filed: Aug. 6, 1979

[51] Int. Cl.³ .............................................. G11B 15/46
[52] U.S. Cl. ....................................................... 360/73
[58] Field of Search .................................... 360/73, 33

[56] References Cited
U.S. PATENT DOCUMENTS

| 3,702,382 | 11/1972 | Breikss | 360/73 |
| 4,193,100 | 3/1980 | Bagley et al. | 360/73 |

Primary Examiner—Vincent P. Canney
Attorney, Agent, or Firm—Keith D. Beecher

[57] ABSTRACT

A control system is provided which is capable of controlling the speed of a video tape recorder in a continuously variable manner, even though the video tape recorder is designed to operate at discrete speeds. The variable speed control is achieved without any need to modify the discrete speed video tape recorder. The control system of the invention selects two of the discrete speeds of the video tape recorder, and then switches between the two speeds at a rate determined by the setting of a variable speed control, so as to enable the video tape recorder to operate at variable speeds between the lower and the higher of the selected discrete speeds, and depending upon the setting of the variable speed control.

4 Claims, 5 Drawing Figures

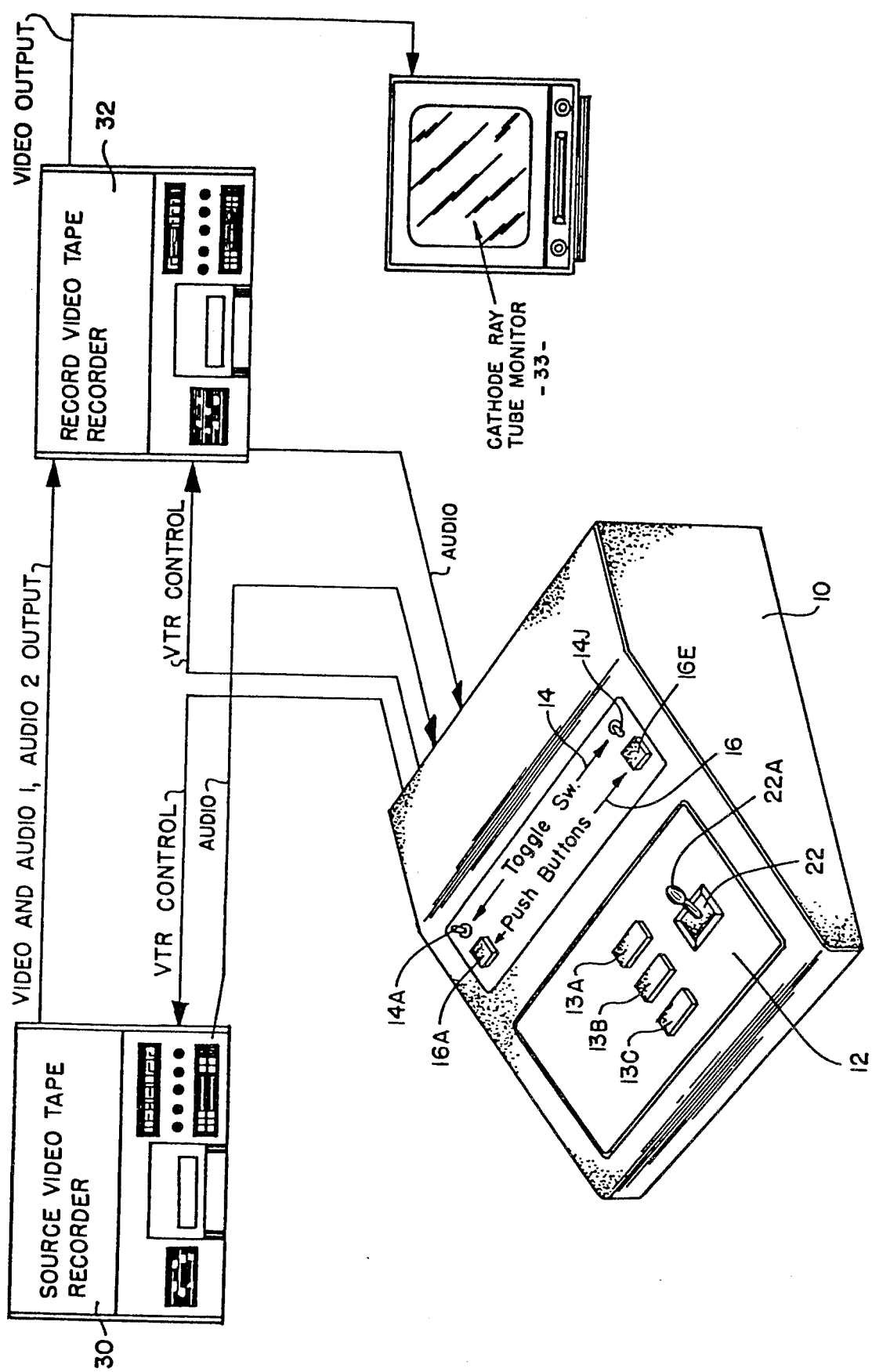

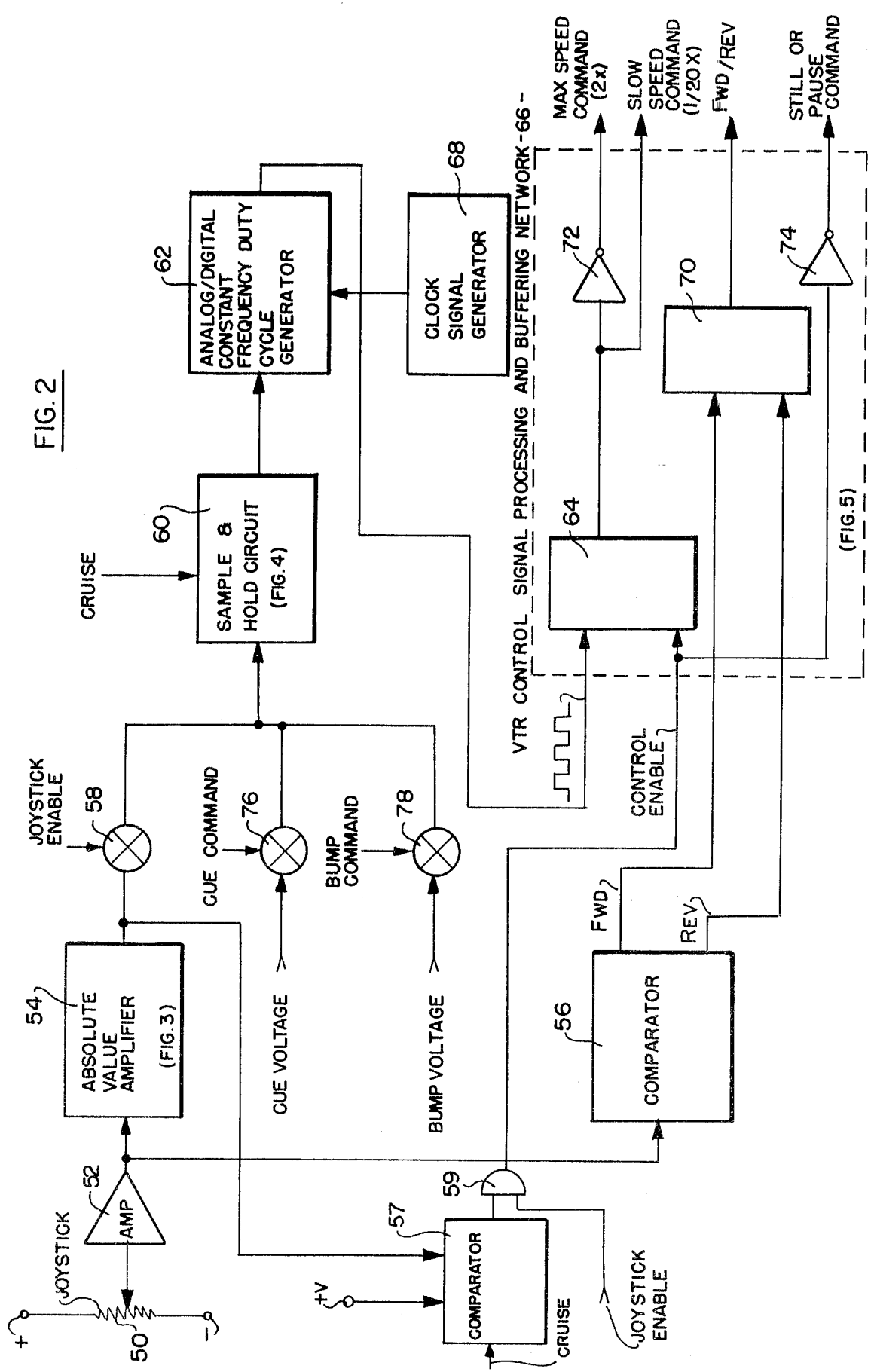

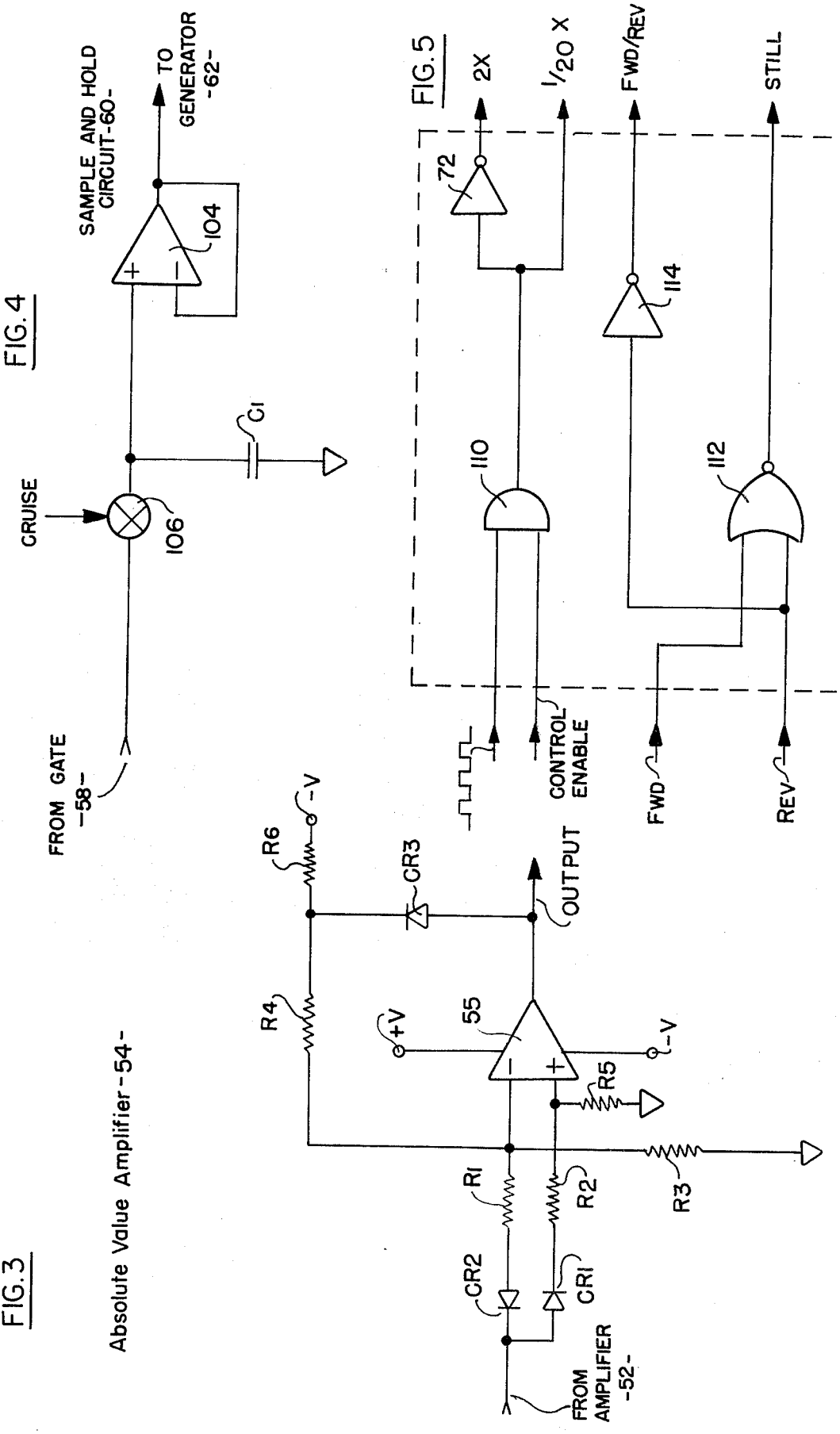

CONTINUOUS SPEED CONTROL SYSTEM FOR VIDEO TAPE RECORDER

BACKGROUND

Many existing video tape recorders, such as the Sony BVU-200A, for example, are constructed to operate at discrete speeds under the control, for example, of a video tape editor such as the Sony BVE-500A. However, in video tape editing processes, and in general, it is often desirable to operate such discrete speed video tape recorders at variable speeds under the control of a manually operable joystick or other manually operable variable speed control, such as is incorporated into video tape editors presently being constructed and sold by the present Assignee, Convergence Corporation. The control system of the present invention provides a simple and economical means by which discrete speeds video tape recorders, such as the Sony BVU-200A, may be controlled to achieve variable speeds, this being accomplished without the need for any modification of the video tape recorder itself.

The Sony BVU-200A video tape recorder, for example, is capable of being controlled to a variety of discrete speeds, such as "still" or "pause" (zero), 1/20 manual play speed (1/20X), 1/5 normal play speed (1/5X), normal play speed (X), and twice normal play speed (2X). The BVU-200A video tape recorder responds to encoded commands from the BVE-500A video tape editor, or from other control sources, to be established at any one of the foregoing discrete speeds. A control is also included in the BVU-200A video tape recorder for establishing either forward or reverse direction of the video tape at any one of the selected discrete speeds.

As mentioned above, the control system of the present invention selects two of the discrete speeds available in the BVU-200A video tape recorder, for example, such as (1/20X), and (2X), and switches between these speeds in a manner which permits a continuously variable speed control of the BVU-200A video tape recorder from, for example, 1/20 normal play speed (1/20X) to twice normal play speed (2X). The continuously variable speed control may be achieved by the joystick of the Convergence video tape editor, as also mentioned above.

In the practice of the invention, the analog control voltage from the joystick is applied to an amplifier which transforms the joystick analog voltage which varies from V− to V+ through zero, to a voltage which only varies between zero and V+. The latter voltage is applied to a constant frequency duty cycle generator which transforms the voltage from the absolute amplifier into a fixed frequency digital waveform whose duty cycle varies as the analog input is changed by adjustment of the joystick. The digital waveform is used to switch between the two selected discrete speeds of the video tape recorder. The result of the controlled switching between the two speeds is a continuously variable tape speed in the video tape recorder as the duty cycle of the digital waveforms changes.

A sample-and-hold circuit may be included to add a "cruise" feature which is incorporated into the Convergence ECS-100 editor, and which causes the tape in the video tape recorder to move at any selected speed for any desired interval without requiring that the joystick control be held in a fixed position for the duration of the interval. Instead, the joystick control may be released, and thereby returned to its zero position, and the tape will continue to move forward or reverse at the preset speed until the cruise function is released, as described in detail in copending application Ser. No. 23,759 filed Mar. 26, 1979, which is assigned to the present Assignee.

BRIEF DESCRIPTION OF THE DRAWINGS

FIG. 1 is a block diagram of a typical video tape editor which may be used as a source of a manually controlled analog voltage which in turn may be processed in accordance with the present invention to provide a continuously variable speed to a discrete speed video tape recorder;

FIG. 2 is a block diagram of the control system of the invention, in one of its embodiments, by which the analog output from a joystick speed control circuit in the system of FIG. 1 is transformed to appropriate control voltages for the discrete speed video tape recorder so as to provide a continuously variable speed control for the recorder; and FIGS. 3–5 are detailed circuit and logic diagrams of certain of the blocks in the block diagram of FIG. 2.

DETAILED DESCRIPTION OF THE ILLUSTRATED EMBODIMENT

Video tape editing control systems for cassette helical scan video tape recorders are known. Such systems are capable, for example, of providing tape-to-tape editing by transferring selected video information from a "source" video tape recorder to a "record" video tape recorder. Typical editing control systems are described, for example, in U.S. Pat. No. 4,040,098 which issued Aug. 2, 1977, and also in copending application Ser. No. 23,759, which was filed Mar. 26, 1979, both of which are assigned to the present Assignee. The editing control systems described in the aforesaid patent and copending application each include a joystick control, by which manual operation of the joystick control enables a controlled video tape recorder to be moved in a continuously variable manner in a forward or reverse direction.

The video tape editor shown in FIG. 1 is contained in a housing 10, and is equipped with an auto joystick control panel 12, such as described in copending application Ser. No. 23,759. A toggle switch panel 14 is mounted on the unit above the control panel 12, and a pushbutton switch panel 16 is also mounted on the unit above the control panel 12, as shown. As also described in the copending application, a four-position joystick control unit 22 is mounted on the control panel 12. The toggle switch control panel 14 includes a series of toggle switches 14A–14J which perform certain designated controls, as described in the copending application, and the pushbutton panel 16 includes a series of pushbuttons 16A–16E which, likewise, provide a series of controls, as also described in the copending application.

The auto joystick control panel 12 also includes a number of pushbutton switches 13A, 13B, 13C which perform certain operations, as described in the copending application. Also, as mentioned above, it includes a joystick 22. Deflecting the joystick 22 momentarily to the lower position causes a record video tape recorder 32 to be disengaged from the joystick control, and causes a source video tape recorder 30 to become engaged by the joystick control. Then, moving the joystick to the right causes the source video tape recorder 30 to move its tape in the forward direction at a speed determined by the amount of joystick deflection; and moving the joystick to the left causes the source video tape recorder 30 to move its tape in the reverse direction at a speed determined by the amount of joystick deflection. When the joystick is released, it returns to its zero position. Then, moving the joystick momentarily to its upper position causes the source video tape recorder 30 to become disengaged, and causes the record video tape recorder 32 to become engaged, and thereafter the record video tape recorder may be controlled in a continuously variable manner by moving the joystick to the right for forward motion of the tape in the record video tape recorder, and to the left for reverse motion of the tape.

An additional feature of the joystick control, and as fully described in the copending application, is a "cruise" switch 22A located at the top of, or conveniently nearby, the joystick. When switch 22A is operated, a "cruise" command is generated in the system. As described in the copending application, when a particular video tape recorder is being controlled by the joystick at any given speed or direction, the actuation of the cruise switch will cause the controlled machine to continue at the same speed and direction independent of the subsequent positions of the joystick.

As shown in FIG. 1, the video output from the record video tape recorder is coupled to a cathode-ray tube monitor, so that the information on the video tape recorders may be monitored, as also described in the copending application.

The block diagram of FIG. 2 represents the speed control system of the invention, in one of its embodiments, it being understood that a speed control system, such as the system shown in FIG. 2, is used in conjunction with each of the video tape recorders 30 and 32, when the video tape recorders are of the discrete speed type, such as the Sony BVU-200A, and that the speeds of the video tape recorders is to be continuously controlled by the joystick 22. Potentiometer 50 in FIG. 2 represents the joystick control 22, when the joystick control is switched to a particular one of the video tape recorders 30 or 32 controlled by the system shown in FIG. 2.

Then, as the joystick 22 is moved, after the particular video tape recorder 30 or 32 has been selected, the wiper of potentiometer 50 moves up and down the potentiometer to introduce an analog voltage to an amplifier 52. The output of amplifier 52 is introduced to a joystick voltage to an absolute value amplifier 54, and to a comparator 56. The output of absolute value amplifier 54 is coupled through a selection gate 58 to a sample-and-hold circuit 60. Other control voltages, such as the cue voltage and bump voltage from editor 10 are also introduced to the sample and hold circuit 60 through selecting gates 76 and 78 respectively, in the presence of the appropriate cue and bump commands. The output of sample-and-hold circuit 60 is introduced to an analog/digital constant frequency duty cycle generator 62 which, in turn, supplies an output to a gate 64 in a VTR control signal processing and buffering network 66. A clock signal generator 68 provides a clock signal for generator 62.

Comparator 56 supplies outputs designated "FWD" or "REV", depending upon the amplified signal introduced to the comparator from the joystick amplifier 52, so as to establish the tape in the controlled video tape recorder in the forward or reverse direction. These outputs are passed through a circuit 70 in network 66 which, in turn, produces an output which has a first value for forward and a second value for reverse.

A control enable signal is applied to gate circuit 64, so the output of generator 62 is passed to an inverter 72 and to circuit 70, only when the control enable signal is true. The control enable command is also introduced to an inverter 74. The control enable command is derived from an "and" gate 59 which, in turn, is connected to a comparator 57. Gate 59 is enabled by a joystick enable signal which is derived from the microprocessor of the video editor, and which is true when the editor is in the joystick mode in which the circuit of potentiometer 50 is activated. One input of comparator 57 is connected to the output of absolute value amplifier 54, and the other input of the comparator is connected to a reference voltage source +V.

A gate 59 is conductive only when the wiper of potentiometer 50 is in the vicinity of its central or null position during the joystick enable mode. Some measure of movement of the wiper on either side of the null position without rendering the "and" gate conductive is permitted by comparator 57. So long as the "and" gate 59 is non-conductive, the control enable signal is false, and the inverter 74 introduces a still or pause command to the controlled video tape recorder, so that there is no motion of the tape in the recorder. However, when the "and" gate 59 is conductive, the control enable command is true, and the gate 64 passes an output to inverter 72 so that the maximum speed command 2X is produced at the output of network 66, and the slow speed command (1/20X), which is the complement of the maximum speed command, is also produced at the output of network 66. The control system of FIG. 2 switches between the slow speed 1/20X and maximum speed 2X at a rate determined by the setting of potentiometer 50.

The absolute value amplifier 54 is shown in more detail in FIG. 3. The absolute value amplifier serves to invert the negative voltages from potentiometer 50, so that as the wiper is moved from the positive end of the potentiometer towards the central null position the amplified analog voltage output from the amplifier 54 drops from a corresponding maximum positive value to zero. Then, when the motion of the wiper continues towards the lower end of the potentiometer, the amplified output of the amplifier 54, instead of going negative, is inverted and rises to the maximum positive value.

The sample-and-hold circuit 60 is shown in more detail in FIG. 4. This circuit is a conventional sample and hold circuit which responds to a CRUISE command, when the cruise switch 22A of FIG. 1 is operated, to perform its sample and hold function.

The analog/digital constant frequency duty cycle generator 62 is a conventional analog-digital converter, and it may take the form of an integrated circuit of the type designated TL507C. The comparator 56 may be any appropriate conventional integrated circuit. A particular implementation of the processing and buffering network 66 is shown in the logic diagram of FIG. 5.

As described briefly above, the joystick analog voltage from potentiometer 50 is fed to amplifier 52, and the amplified voltage is then compared in comparator 56 to determine whether the tape in the control video tape recorder is to be controlled for forward or reverse motion, which in turn depends on the setting of joystick 22 on either side of its zero (null) position. The output of an amplifier 52 is also supplied to the absolute value amplifier 54 which converts the positive and negative output of amplifier 52 to positive voltage levels appropriate for the system, as described above. The output of amplifier 54 is applied to the transmission gate 58 which is controlled by the joystick select command, when the joystick control circuit is activated. The output of transmission gate 58, together with the outputs of transmission gates 76 and 78, is applied to the sample-and-hold circuit 60, as also described above. The other transmission gates 76 and 78 control the introduction of the cue voltage and bump voltage to the sample-and-hold circuit 60, for purposes described in the copending application.

The output of the sample-and-hold circuit 60 is applied to the analog/digital constant frequency duty cycle generator 62 which is a single slope voltage-to-time analog-digital converter of the type designated TL507C, and which has an independent clock input, derived from clock generator 68. The frequency of the clock is selected to be compatible with the video tape recorder being controlled by the system.

The output of the generator 62, together with the forward and reverse commands from comparator 56, and the control enable signal from "and" gate 59, are all applied to the processing and buffering network 66. Network 66 provides the maximum speed command and slow speed command to the controlled video tape recoder, and switches between these commands at a rate determined by the digital output of generator 62, which, in turn, depends on the setting of the joystick 50. This means that the controlled speed of the tape in the video tape recorder may be controlled in a continuously variable manner to any desired speed between the slow speed (1/20X) and maximum speed (2X) by the joystick. Also, the tape is controlled in the forward or reverse direction, as determined by movement of the joystick to one side or the other of its zero position. When the control enable signal is not true, the tape of the controlled video tape recorder is caused to stop.

All the commands issued to the controlled video tape recorder by the signal processing and buffering network 66 are normal commands for the discrete speed video tape recorder, such as the Sony BVU-200A, so that no modifications are required within the video tape recorder itself, to convert the video tape recorder to a continuously variable type.

The converter 54 of FIG. 2, as shown in FIG. 3, comprises an operational amplifier 55 connected as shown, and which may be of the type designated TL081. In the circuit resistors R1, R2, R3 and R4 may have a resistance of 10 kilo-ohms, resistor R5 may have a resistance of 9.1 kilo-ohms, and resistor R6 may have a resistance of 100 kilo-ohms. An input diode CR1 is connected with one polarity to the positive input of amplifier 100, and an input diode CR2 is connected with the opposite polarity to the negative input of amplifier 55. A third diode CR3 provides a feedback path to the junction of R4 and R6 to stabilize the output of amplifier 100.

The sample-and-hold circuit 60, as shown in FIG. 4, includes an operational amplifier 104, and a charging capacitor C1 connected to the positive input of the amplifier. The circuit is controlled by the CRUISE command applied to transmission gate 106. As mentioned above, the CRUISE command is generated when the cruise switch 22A of FIG. 1 is operated. The voltage present on capacitor C1 at the output of amplifier 104 is maintained at a constant value when the transmission gate 106 is opened by the CRUISE command. Thus the voltage generated by potentiometer 50 present at capacitor C1 at the time a cruise function is activated remains at the output of amplifier 104 even after potentiometer 50 is returned to the zero position.

The processing and buffering network 66, as shown in FIG. 5, in a particular implementation, includes an "and" gate 110 whose output is connected to inverter 72; and the network also includes a "nor" gate 112 to which the FWD and REV commands are applied and which generates the STILL command. The FWD/REV command is generated by an inverter 114, connected as shown.

It will be appreciated that although a particular embodiment of the system of the invention has been shown and described, modifications may be made. It is intended in the claims to cover the modifications which come within the spirit and scope of the invention.

What is claimed is:

1. A control system for providing a continuously variable speed control for a video tape recorder, which recorder is designed to operate at discrete speeds and which is responsive to a speed control signal having first and second levels to operate at a first selected speed when the speed control signal is established at the first level, and at a second selected speed when the speed control signal is established at a second level, and said control system comprising: digitizing means responsive to an applied analog input signal for producing output pulses having durations dependent upon the value of the analog input signal; and circuit means coupled to said digitizing means and responsive to the output pulses therefrom for causing said speed control signal to be switched between said first and second levels at a rate determined by the durations of said output pulses.

2. The control system defined in claim 1, and which includes a clock oscillator circuit coupled to said digitizing means to supply a clock signal thereto for establishing the frequency of the output pulses.

3. The control system defined in claim 1, and which includes a manually operated potentiometer means connected to said digitizing means for supplying said analog input signal thereto.

4. The control system defined in claim 3, and which includes a sample-and-hold circuit interposed between said potentiometer means and said digitizing means for causing the speed of the video tape recorder to be maintained at a set value regardless of subsequent settings of said potentiometer means.

* * * * *